(12) United States Patent
Yang et al.

(10) Patent No.: US 12,328,654 B2
(45) Date of Patent: Jun. 10, 2025

(54) METHOD AND SYSTEM FOR INTELLIGENT END-TO-END TIERED ARCHITECTURE FOR APPLICATION SERVICES

(71) Applicant: Verizon Patent and Licensing Inc., Basking Ridge, NJ (US)

(72) Inventors: Jin Yang, Orinda, CA (US); Susan Wu Sanders, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 335 days.

(21) Appl. No.: 17/704,541

(22) Filed: Mar. 25, 2022

(65) Prior Publication Data

US 2023/0308982 A1   Sep. 28, 2023

(51) Int. Cl.
*H04W 40/02*   (2009.01)
*H04W 4/50*    (2018.01)

(52) U.S. Cl.
CPC ............ *H04W 40/02* (2013.01); *H04W 4/50* (2018.02)

(58) Field of Classification Search
CPC ....... H04L 67/63; H04L 45/64; H04L 45/121; H04L 45/126; H04L 45/127; H04W 8/082; H04W 4/00; H04W 40/20; H04W 40/02; H04W 4/50; Y02D 30/70
See application file for complete search history.

(56) References Cited

U.S. PATENT DOCUMENTS

| | | | |
|---|---|---|---|
| 2017/0048876 A1* | 2/2017 | Mahindra | ............. H04L 12/407 |
| 2022/0038554 A1* | 2/2022 | Merwaday | ............. H04L 45/64 |
| 2022/0279421 A1* | 9/2022 | Sivakumar | .......... H04W 40/248 |
| 2023/0034349 A1* | 2/2023 | Mladin | .................... H04W 4/40 |
| 2023/0209402 A1* | 6/2023 | Ronkainen | ............ H04W 8/082 370/229 |

\* cited by examiner

*Primary Examiner* — Dady Chery (57) ABSTRACT

A system, a network, an end-to-end network, a method, a non-transitory computer-readable storage medium are described of an intelligent end-to-end architecture for tiers of application services. The system may include a radio access network (RAN) that provides radio access to a core network and mobile edge application service layer networks located at different mobile edges including a far edge, a mid edge, and an edge, in which the RAN includes a first centralized RAN control plane device at the far edge that provides a RAN control plane service for first traffic relating to the far edge and the mid edge but not the edge; and the core network includes a first centralized core network control plane device at the far edge that provides a core network control plane service for the first traffic relating to the far edge and the mid edge but not the edge.

20 Claims, 4 Drawing Sheets

METHOD AND SYSTEM FOR INTELLIGENT END-TO-END TIERED ARCHITECTURE FOR APPLICATION SERVICES

BACKGROUND

Development and design of networks present certain challenges from a network-side perspective and an end device perspective. For example, Next Generation (NG) wireless networks, such as Fifth Generation New Radio (5G NR) networks are being deployed and under development.

DETAILED DESCRIPTION

The following detailed description refers to the accompanying drawings. The same reference numbers in different drawings may identify the same or similar elements. Also, the following detailed description does not limit the invention.

Radio access and core functions in the user and control planes are provisioned to support access and use of application services by end devices. As with any architecture and arrangement of radio access and core functions, different application services may require minimal performance metrics, such as reliability, latency, and/or another criterion (e.g., bit rate, error rate, and so forth). Further, for network operators or service providers, for example, the radio access and core functions may be provisioned with network efficiency in mind, as well as other factors, such as flexibility, scalability, and the like. For example, deployment of radio access and core functions at the far edge can be cost prohibitive at least due to the geographic span and number of network resources needed to provide service to users.

Application services may be provisioned in various types of networks, such as a cloud network, a public network (e.g., the Internet, the Web, etc.), a multi-access edge computing (MEC) network (also known as a mobile edge computing network), a data center, a fog network, a packet data network (PDN), or the like. Depending on the location of the application service layer network and type of application services, the ability to provide end-to-end services that support various performance metrics and network efficiency, flexibility, scalability, and the like can be complex.

According to exemplary embodiments, an intelligent end-to-end architecture for tiers of application services is described. According to an exemplary embodiment, the intelligent end-to-end architecture for tiers of application services includes a multi-tiered architecture of radio access network (RAN) devices and core network devices. According to an exemplary embodiment, RAN control plane and/or core control plane function(s) of one tier and associated application service layer network at a location may also provide the RAN control plane and/or core control plane function(s) for another tier and another application service layer network at a different and/or remote location, as described herein. For example, according to an exemplary embodiment, a centralization of RAN and core control plane functions located at a far edge that provide network paths to far edge application services of a far edge application service layer network may also provide the RAN and core control plane functions for network paths to mid edge tiered application services of a mid edge application service layer network.

According to an exemplary embodiment, RAN user plane and/or core user plane function(s) for each tier of the multi-tiered architecture may be de-centralized or distributed, as described herein.

According to an exemplary embodiment, the intelligent end-to-end architecture for tiers of application services may include multi-tiered application service layer networks. For example, the multi-tiered application service layer networks may include a tiering of MEC networks (e.g., far edge, mid edge, edge) or some other nomenclature and/or number. According to an exemplary embodiment, the multi-tiered application service layer networks may be communicatively coupled to corresponding multi-tiered RAN devices and core network devices, as described herein.

According to an exemplary embodiment, the intelligent end-to-end architecture for tiers of application services may include centralized and distributed controllers that may manage routing of application service requests from end devices to a corresponding tier of the intelligent end-to-end architecture based on various criteria, as described herein. For example, the criteria may relate to connectivity configuration (e.g., standalone, non-standalone), Quality of Service (QoS) values (e.g., Fifth Generation QoS Identifier (5QI), Quality of Class Indicator (QCI)), network slice information, public land mobile network (PLMN) identifiers, and other factors, as described herein.

In view of the foregoing, the intelligent end-to-end architecture for tiers of application services may retain a high degree of network efficiency without sacrificing performance for the application services accessed and used by end devices. For example, network efficiency and cost associated with far edge deployment of RAN and core user plane and control plane services may be offset or counterbalanced by their centralization. By way of further example, the RAN control plane and/or core control plane devices of the far edge may also be used to support other edge deployments, such as mid edge deployments Additionally, the intelligent end-to-end architecture for tiers of application service may intelligently manage the routing of application service requests to different tiers of the multi-tier architecture based on centralized and distributed controllers and configured criteria.

Figure 1:
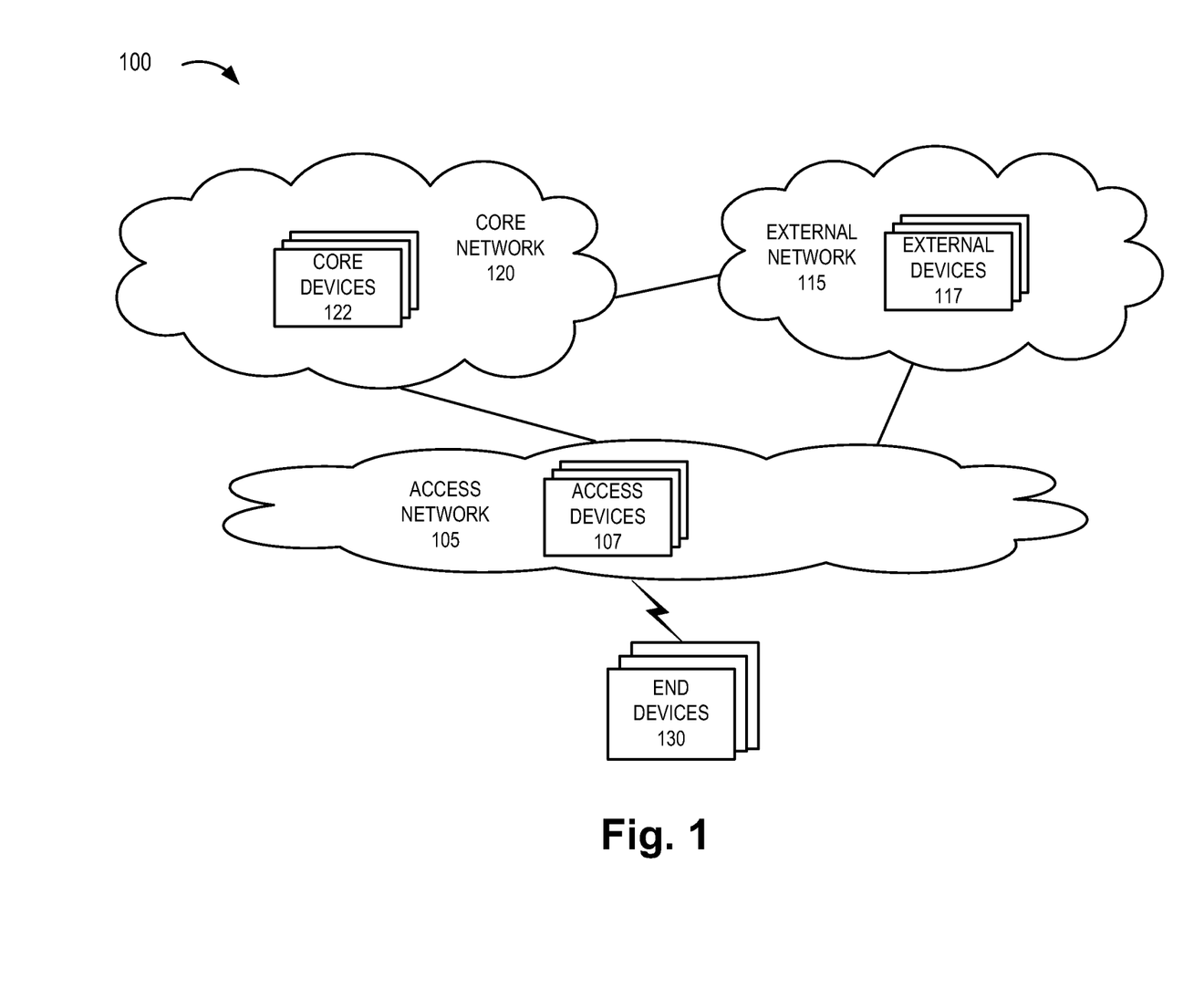
FIG. 1 is a diagram illustrating an exemplary environment in which an exemplary embodiment of an intelligent end-to-end architecture for tiers of application services may be implemented.

FIG. 1 is a diagram illustrating an exemplary environment 100 in which an exemplary embodiment of intelligent end-to-end architecture for tiers of application services may be implemented. As illustrated, environment 100 includes an access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122). Environment 100 further includes end devices 130 (also referred to individually or generally as end device 130).

According to an exemplary embodiment of environment 100, at least some of access devices 107, core device 122, and external devices 117 may be provisioned in accordance with an exemplary embodiment of the intelligent end-to-end architecture for tiers of application services, as described herein.

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or another type of network that may support a wireless service and/or an application service, as described herein.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into distinct types of network architectures (e.g., Software Defined Networking (SDN), virtual, logical, network slice, etc.). The number, the type, and the arrangement of network devices are exemplary.

Environment 100 includes communication links between the networks and between the network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the intelligent end-to-end architecture for tiers of application services may use at least one of these planes of communication. Additionally, an interface of a network device may be modified (e.g., relative to an interface defined by a standards body, such as 3GPP, 3GPP2, ITU, ETSI, GSMA, and the like) or a new interface of the network device may be provided in order to support the communication (e.g., transmission and reception of messages, an information element (IE), an attribute value pair (AVP), an object, a parameter, or another form of a data instance) between network devices and the intelligent end-to-end architecture for tiers of application services logic of the network device. According to various exemplary implementations, the interface of the network device may be a service-based interface, a reference point-based interface, an Open Radio Access Network (O-RAN) interface, a 5G interface, another generation of interface (e.g., 5.5G, Sixth Generation (6G), Seventh Generation (7G), etc.), or some other type of network interface.

Access network 105 may include one or multiple networks of one or multiple types and technologies. For example, access network 105 may be implemented to include a Fifth Generation (5G) RAN, a future generation RAN (e.g., a 6G RAN, a 7G RAN, or a subsequent generation RAN), a centralized-RAN (C-RAN), an O-RAN, and/or another type of access network. Access network 105 may include a legacy RAN (e.g., a Third Generation (3G) RAN, a Fourth Generation (4G) or 4.5 RAN, etc.). Access network 105 may communicate with and/or include other types of access networks, such as, for example, a Wi-Fi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105.

Depending on the implementation, access network 105 may include one or multiple types of network devices, such as access devices 107. For example, access device 107 may include a next generation Node B (gNB), an evolved LTE (eLTE) evolved Node B (eNB), an eNB, a radio network controller (RNC), a remote radio head (RRH), a baseband unit (BBU), a radio unit (RU), a remote radio unit (RRU), a centralized unit (CU), a CU-CP, a CU-UP, a distributed unit (DU), a small cell node (e.g., a picocell device, a femtocell device, a microcell device, a home eNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. Access device 107 may also include other types of network devices, such as a radio network controller (RNC), a RAN Intelligent Controller (RIC), an orchestrator device, an artificial intelligence (AI) and/or machine learning (ML) device, or another type of RAN management or control level network device.

According to various exemplary implementations, access device 107 may include one or multiple sectors or antennas. The antenna may be implemented according to various configurations, such as single input single output (SISO), single input multiple output (SIMO), multiple input single output (MISO), multiple input multiple output (MIMO), massive MIMO, three dimensional (3D) and adaptive beamforming (also known as full-dimensional agile MIMO), two dimensional (2D) beamforming, antenna spacing, tilt (relative to the ground), radiation pattern, directivity, elevation, planar arrays, and so forth. Depending on the implementation, access device 107 may provide a wireless access service at a cell, a sector, a sub-sector (also known as a geo-bin), and/or another configurable level.

Access network 105 may include different and multiple functional splitting, such as options 1, 2, 3, 4, 5, 6, 7, or 8 that relate to combinations of access network 105 and a core network including, for example, an evolved packet core (EPC) network and/or an 5G core network, or the splitting of the various layers (e.g., physical layer, medium access control (MAC) layer, radio link control (RLC) layer, packet data convergence protocol (PDCP) layer, and/or other layers), plane splitting (e.g., user plane, control plane, etc.), interface splitting (e.g., F1-U, F1-C, F2-C, F2-U, E1, Xn-C, Xn-U, X2-C, Common Public Radio Interface (CPRI), etc.) as well as other types of network services, such as dual connectivity (DC) or higher, carrier aggregation (CA), edge and core network slicing, coordinated multipoint (CoMP), various duplex schemes, and/or another type of connectivity service (e.g., non-standalone (NSA) new radio (NR), stand-alone (SA) NR, and the like).

External network 115 may include one or multiple networks of one or multiple types and technologies that provides an application service. For example, external network 115 may be implemented using one or multiple technologies including, for example, network function virtualization (NFV), software defined networking (SDN), cloud computing, Infrastructure-as-a-Service (IaaS), Platform-as-a-Service (PaaS), Software-as-a-Service (SaaS), or another type of network technology. External network 115 may be implemented to include a cloud network, a private network, a public network, a MEC network, a fog network, the Internet, a PDN, a service provider network, the World Wide Web (WWW), an Internet Protocol Multimedia Subsystem (IMS) network, a Rich Communication Service (RCS) network, an SD network, a virtual network, a packet-switched network, a data center, or other type of network that may provide access to and may host an end device application service.

Depending on the implementation, external network 115 may include various network devices such as external devices 117. For example, external devices 117 may include virtual network devices (e.g., virtualized network functions (VNFs), servers, host devices, containers, hypervisors, virtual machines (VMs), network function virtualization infrastructure (NFVI), and/or other types of virtualization elements, layers, hardware resources, operating systems, engines, etc.) that may be associated with application services for use by end devices (not illustrated). By way of further example, external devices 117 may include mass storage devices, data center devices, NFV devices, SDN devices, cloud computing devices, platforms, and other types of network devices pertaining to various network-related functions (e.g., security, management, charging, billing, authentication, authorization, policy enforcement, development, etc.). External network 115 may include one or multiple types of core devices 122, as described herein.

External devices 117 may host one or multiple types of application services. For example, the application services may pertain to broadband services in dense areas (e.g., pervasive video, smart office, operator cloud services, video/photo sharing, etc.), broadband access everywhere (e.g., 50/100 Mbps, ultra-low-cost network, etc.), enhanced mobile broadband (eMBB), higher user mobility (e.g., high speed train, remote computing, moving hot spots, etc.), IoTs (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), massive machine-type communications (mMTC), voice, conferencing, instant messaging), video streaming, and/or other types of wireless and/or wired application services. External devices 117 may also include other types of network devices that support the operation of external network 115 and the provisioning of application services, such as an orchestrator, an edge manager, an operations support system (OSS), a local domain name system (DNS), registries, and/or external devices 117 that may pertain to various network-related functions (e.g., security, management, charging, billing, authentication, authorization, policy enforcement, development, etc.). External devices 117 may include non-virtual, logical, and/or physical network devices.

Core network 120 may include one or multiple networks of one or multiple network types and technologies. Core network 120 may include a complementary network of access network 105. For example, core network 120 may be implemented to include a 5G core network, an evolved packet core (EPC) of a Long Term Evolution (LTE) network, an LTE-Advanced (LTE-A) network, and/or an LTE-A Pro network, a future generation core network (e.g., a 5.5G, a 6G, a 7G, or another generation of core network), and/or another type of core network.

Depending on the implementation of core network 120, core network 120 may include diverse types of network devices that are illustrated in FIG. 1 as core devices 122. For example, core devices 122 may include a user plane function (UPF), a Non-3GPP Interworking Function (N3IWF), an access and mobility management function (AMF), a session management function (SMF), a unified data management (UDM) device, a unified data repository (UDR), an authentication server function (AUSF), a network slice selection function (NSSF), a network repository function (NRF), a policy control function (PCF), a binding support function (BSF), a network data analytics function (NWDAF), a network exposure function (NEF), a service capability exposure function (SCEF), a lifecycle management (LCM) device, an application function (AF), a mobility management entity (MME), a packet gateway (PGW), an enhanced packet data gateway (ePDG), a serving gateway (SGW), an application function (AF), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS).

According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), and/or other combined nodes (e.g., an HSS with a UDM and/or UDR, an MME with an AMF, etc.). Also, core devices 122 may include a split core device 122. For example, core devices 122 may include a session management (SM) PCF, an access management (AM) PCF, a user equipment (UE) PCF, and/or another type of split architecture associated with another core device 122, as described herein.

According to an exemplary embodiment, core devices 122 may include controllers that manage the routing of application service requests from end devices 130 to different tiers of the multi-tier network based on various criteria.

According to an exemplary embodiment, the controllers may use criteria that includes a 5QI, a RAT/Frequency Selection Priority (RFSP) Index, network slice selection assistance information (NSSAI), a PLMN-ID for SA, and a QCI, a subscriber profile identifier (SPID), and a PLMN-ID for NSA. According to an exemplary embodiment, the controllers may include a centralized controller and a distributed controller, as described herein.

End device 130 includes a device that may have communication capabilities (e.g., wireless, wired, optical, etc.). End device 130 may or may not have computational capabilities. End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a phablet, a wearable device (e.g., a watch, glasses, etc.), a computer, a gaming device, a music device, an IoT device, a drone, a smart device, or other type of wireless device (e.g., other type of UE). End device 130 may be configured to execute various types of software (e.g., applications, programs, etc.). The number and the types of software may vary among end devices 130. End devices 130 may include "edge-aware" and/or "edge-unaware" application service clients. For purposes of description, end device 130 is not considered a network device.

End device 130 may support one or multiple RATs (e.g., 4G, 5G, and/or future generation RAT) and various portions of the radio spectrum (e.g., multiple RF bands, multiple carrier frequencies, licensed, unlicensed, mm wave, above mm wave, cm wave, etc.), various levels and genres of network slicing, DC service, CA service, and/or other types of connectivity services. Additionally, end device 130 may include one or multiple communication interfaces that provide one or multiple (e.g., simultaneous, interleaved, etc.) connections via the same or different RATs, frequency bands, carrier frequencies, network slices, and/or via another communication medium (e.g., wired, etc.). The multimode capabilities of end device 130 may vary among end devices 130.

Figure 2:
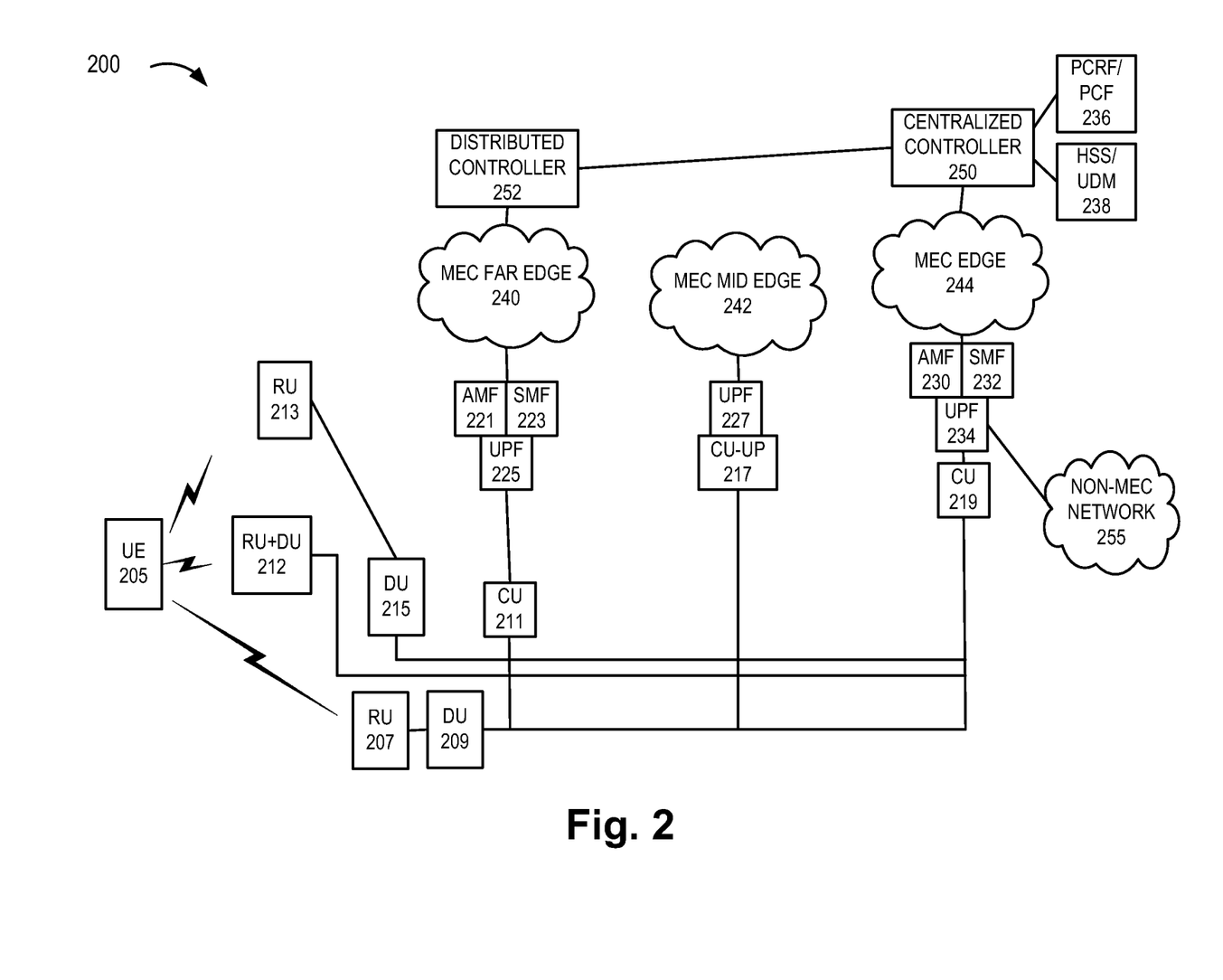
FIG. 2 is a diagram illustrating another exemplary environment in which an exemplary embodiment of the intelligent end-to-end architecture for tiers of application services may be implemented.

FIG. 2 is a diagram illustrating an exemplary environment 200 in which an exemplary embodiment of the intelligent end-to-end architecture for tiers of application services may be implemented. As illustrated, environment 200 may include a UE 205 (e.g., end device 130); an RU 207, a DU 209, a CU 211, an RU+DU 212, a RU 213, a DU 215, a CU-UP 217, and a CU 219 (e.g., access devices 107); an AMF 221, an SMF 223, a UPF 225, a UPF 227, an AMF 230, an SMF 232, a UPF 234, a PCRF/PCF 236, and an HSS/UDM 238 (e.g., core devices 122); a MEC far edge network 240, a MEC mid-edge network 242, a MEC edge network 244, and a non-MEC network 255 (e.g., external networks 115). As further illustrated, environment 200 may include a centralized controller 250 and a distributed controller 252. Centralized controller 250 and/or distributed controller 252 may be implemented as core device 122, for example.

According to this example, environment 200 includes a three-tiered architecture, such as a far edge tier, a mid edge tier, and an edge (or near edge) tier. According to other examples, environment 200 may include a two-tiered, a four-tiered, or larger numbered (e.g., five, etc.) tiered architecture. For the sake of description, the different tiers, such as (mobile) far edge, (mobile) mid edge, and (mobile) edge may each be distinguishable from another tier/edge based on one or multiple criteria, such as physical location (e.g., proximity to the user, proximity to a network (e.g., RAN, core, cloud, etc.), etc.), performance metric associated with network path (e.g., round trip latency, reliability, bitrate, etc.), scale requirements, and/or other types of network-related factors.

Additionally, as described in relation to FIG. 1, access devices 107 of environment 200 may include other types of access devices 107, not specifically illustrated and described in FIG. 2, such as an eNB, which may support NSA connectivity, and/or other types of core devices 122, such as a PGW, an SGW, and so forth. Additionally, similar to that described in relation to FIG. 1 and environment 100, the number, type, and arrangement of networks and network devices illustrated in environment 200 are exemplary. Additionally, the number, type, and arrangement of communication links illustrated in environment 200 are exemplary. A communicative connection via a communication link may be direct or indirect.

Referring to FIG. 2, an exemplary embodiment, the far edge may include different split configurations of RUs and DUs, in which RU and DU may be remote from each other (e.g., RU 213 and DU 215), integrated (RU+DU 212), or co-located (RU 207 and DU 209). As further illustrated in FIG. 2, the RUs and the DUs may provide UE 205 access to the different tiered MECs, such as MEC far edge 240, MEC mid edge 242, and MEC edge 244. According to various exemplary embodiments, the RUs and the DUs may be remote from, co-located to, or integrated with a CU. For example, DU 215 may be remote from CU 211 and DU 209 may be co-located or integrated with CU 211. According to an exemplary embodiment, CU 211 may be implemented as a unified CU that includes both a CU-UP and a CU-CP. According to another exemplary embodiment, although not illustrated, CU 211 may be implemented according to a split architecture. According to some exemplary embodiments, RU 207, DU 209, and CU 211 may be implemented as a gNB.

According to an exemplary embodiment, CU 211 may provide centralized RAN control plane services (e.g., that of a CU-CP) for both the far edge and the mid edge and associated respective application services of MEC far edge network 240 and MEC mid edge network 242, associated respective network slices, network paths, and so forth. For example, the centralized RAN control plane service may include providing Radio Resource Control (RRC) services, and providing control plane services of the PDCP, E1 interface with the CU-UP, and F1-C interface with the DU, and other types of RAN control plane services of a gNB/CU-CP according to a network standard (e.g., 3GPP or the like) and/or of a proprietary nature. As an example, the CU-CP of CU 211 of the far edge may cooperatively operate with CU-UP 217 of the mid edge. As further described, the CU-CP of CU 211 may also cooperatively operate with core control plane device, such as AMF 221, to support mid tier access and use of application services, as well as AMF 221 and UPF 225 to support far edge access and use of application services. The CU-UP of CU 211 and CU 219, and CU-UP 217 may each provide, for example, RAN user plane services, such as providing user plane service of the PDCP and SDAP, E1 and F1-U interfaces, and other types of RAN user plane services of a gNB/CU-UP according to a network standard (e.g., 3GPP or the like) and/or of a proprietary nature.

According to an exemplary embodiment, AMF 221 and SMF 223 of the far edge may provide centralized core control plane services (e.g., AMF services, SMF services) for both the far edge and the mid edge and associated respective application services of MEC far edge network 240 and MEC mid edge network 242, associated respective network slices, network paths, and so forth. For example, AMF 221 may perform non-access stratum (NAS) signaling for access and mobility management, UE authentication, allocation of global unique temporary identifier (GUTI) and temporary mobile subscriber identity (TMSI), UE security context, registration, connection, reachability, and mobility management, apply mobility related policies, and other types of core control plane services of an AMF according to a network standard (e.g., 3GPP or the like) and/or of a proprietary nature. Additionally, for example, SMF 223 may perform NAS signaling for session management, manage PDU sessions, allocate IP addresses to UE 205, provide selection and control of UPF 225, send QoS and policy information to RAN via the AMF 221, apply policy and charging for services, and other types of core control plane services of an SMF according to a network standard (e.g., 3GPP or the like) and/or of a proprietary nature. As an example, SMF 223 of the far edge may cooperatively operate with UPF 227 of the mid edge as well as UPF 225 of the far edge to support respective mid tier and far edge access and use of application services. UPF 225 may provide various core network user plane services, such as RAN/data network interconnection, packet inspection, packet routing and data forwarding, QoS management and usage reporting, and other types of core user plane services of a UPF according to a network standard (e.g., 3GPP or the like) and/or of a proprietary nature. UPF 227 and UPF 234 may provide similar functionality.

Based on this framework, the far edge network path to MEC far edge network 240 and associated application services hosted by MEC far edge network 240 may offer the lowest latency, highest reliability, and high(est) network efficiency. For example, ultra-low latency and high reliability may be achieved with both RAN/core user plane/control plane functions and application servers (not illustrated) of MEC far edge network 240 located at the far edge (e.g., co-located with access device 107). According to other examples, AMF 221, SMF 223, UPF 225, and/or MEC far edge servers may be implemented physically or virtually at user sites (e.g., shopping malls, enterprises, factories, stadiums, or another type of site) or a data center (e.g., of a network operator, service provider, etc.). The far edge tier may provide access and use—end-to-end between UE 205 and application servers (e.g., external devices 117) that may host application services at MEC far edge 240 with little or no dependency on other portions/core devices 122 of core network 120 and other types of networks (e.g., X-haul, transport, etc.).

In contrast to the far edge tier, mid edge tier architecture may omit control plane functions for both the RAN and the core devices and provide RAN and core user plane devices, such as CU-UP 217 and UPF 227. CU-UP 217 and UPF 227 may provide a network path to MEC mid edge network 242. With the omission of control plane functions located at the mid edge for both the RAN and the core devices, the network cost and network efficiency (e.g., of network resources) associated with far edge deployment may be offset or counterbalanced. The mid edge tier network path—from end-to-end between UE 205 and application services of MEC mid edge network 242 may provide diminished latency, reliability, and/or another performance metric relative to the far edge tier network path between UE 205 and MEC far edge network 240. As an example, MEC far edge network 240 may host ultra-reliable low latency communication type application services, such as autonomous vehicle, drone delivery, industrial automation, and the like. According to another example, MEC mid edge network 242 may host application services that may be more delay tolerant than those of MEC far edge network 240 and/or relate to application service that may differ according to other types of performance metrics.

According to an exemplary embodiment, distributed controller 252 may manage the assignment and/or fulfillment of application service requests from UE 205 to the far edge and the mid edge. Distributed controller 252 may include logic that determines and selects between a far edge network path/network slice or a mid edge network path/network slice based on various criteria as described herein. For example, as previously described, depending on the connectivity of UE 205 (e.g., NSA versus SA), the category, type, or individual application service requested, QoS values (e.g., 5QI, QCI), an RFSP Index, NSSAI, a PLMN-ID, a SPID, and other factors (e.g., load, etc.) or context (e.g., mobility of UE 205, etc.), as described herein, distributed controller 252 may makes these determinations and selections. Distributed controller 252 may store and apply threshold values relating to one or more of the criteria mentioned to select the appropriate edge architecture, for example. For example, a certain range of 5QI values may be correlated to the far edge and another range of 5QI values may be correlated to the mid edge. According to some exemplary embodiments, determination and selection between the far edge and the mid edge may be based on communication and/or instruction from centralized controller 250, as described herein. For example, distributed controller 252 may obtain criteria information of relevance to UE 205 and an application service request (e.g., 5QI, NSSAI, SPID, etc.), in whole or in part, from centralized controller 250, PCRF/PCF 236, and/or HSS/UDM 238.

According to some exemplary embodiments, distributed controller 252 may include service orchestration logic that may manage the provisioning and/or configuration of access devices 107 and core devices 122 that support the far and mid edges, respectively. As an example, distributed controller 252 may communicate with AMF 221 to enable network path/network slice setup for UE 205 and establishment of an application service session with a MEC server (not illustrated), which hosts the requested application service, of MEC far edge network 240 or a MEC server (also not illustrated), which hosts the requested application service, of MEC mid edge network 242. In either case, AMF 221 may further communicate with a CU-CP of CU 211 and SMF 223, and so forth.

For the edge tier, CU 219 may be implemented as a unified CU that includes both a CU-UP and a CU-CP or may be implemented according to a split architecture. According to an exemplary embodiment, CU 219 may provide centralized RAN control plane services (e.g., that of a CU-CP) for both the edge and non-MEC network 255 and associated respective application services of MEC edge network 244 and non-MEC network 255, associated respective network slices, network paths, and so forth. Non-MEC network 255 may include, for example, the Internet, local breakout (LBO)/local zones, a cloud data center, a public network, and/or another type of non-MEC network that may provide an application service.

According to an exemplary embodiment, AMF 230 and SMF 232 of the edge may provide centralized core control plane services (e.g., AMF services, SMF services) for the edge. According to another exemplary embodiment, AMF 230 and SMF 232 of the edge may provide centralized core control plane services (e.g., AMF services, SMF services)

for the edge and non-MEC network 255. According to an exemplary embodiment, UPF 234 may provide centralized core user plane service for the edge or the edge and non-MEC network 255.

According to an exemplary embodiment, centralized controller 250 may manage the assignment and/or fulfillment of application service requests from UE 205 to the edge and non-edge (e.g., non-MEC network 255). According to another exemplary embodiment, centralized controller 250 may manage the assignment and/or fulfillment of application service requests from UE 205 to the far edge, the mid edge, the edge and non-mobile edge network 255. Centralized controller 250 may include logic that determines and selects between an edge network path/network slice or a non-edge network path/network slice based on various criteria as described herein. For example, as previously described, depending on the connectivity of UE 205 (e.g., NSA versus SA), the category, type, or individual application service requested, QoS values (e.g., 5QI, QCI), an RFSP Index, NSSAI, a PLMN-ID, a SPID, and other factors (e.g., load, etc.) or context (e.g., mobility of UE 205, etc.), as described herein. Centralized controller 250 may store and apply threshold values relating to one or more of the criteria mentioned to select the appropriate edge architecture or non-MEC network 255, for example. For example, a certain range of 5QI values may be correlated to the edge and another range of 5QI values may be correlated to the non-edge. According to an exemplary embodiment, centralized controller 250 may obtain criteria information of relevance to UE 205 and an application service request (e.g., 5QI, NSSAI, SPID, etc.), in whole or in part, from PCRF/PCF 236 and/or HSS/UDM 238.

According to some exemplary embodiments, centralized controller 250 may include service orchestration logic that may manage the provisioning and/or configuration of access devices 107 and core devices 122 that support the edge and non-edge, respectively. As an example, centralized controller 250 may communicate with AMF 230 to enable network path/network slice setup for UE 205 and establishment of an application service session with a MEC server (not illustrated), which hosts the requested application service, of MEC edge network 244 or a MEC server (also not illustrated), which hosts the requested application service, of non-MEC network 255. In either case, AMF 230 may further communicate with a CU-CP of CU 219 and SMF 232, and so forth.

FIG. 2 is a diagram illustrating an exemplary multi-tiered architecture of an exemplary embodiment of the intelligent end-to-end architecture for tiers of application services. According to other exemplary embodiments, the multi-tiered architecture may be implemented differently.

Figure 3:
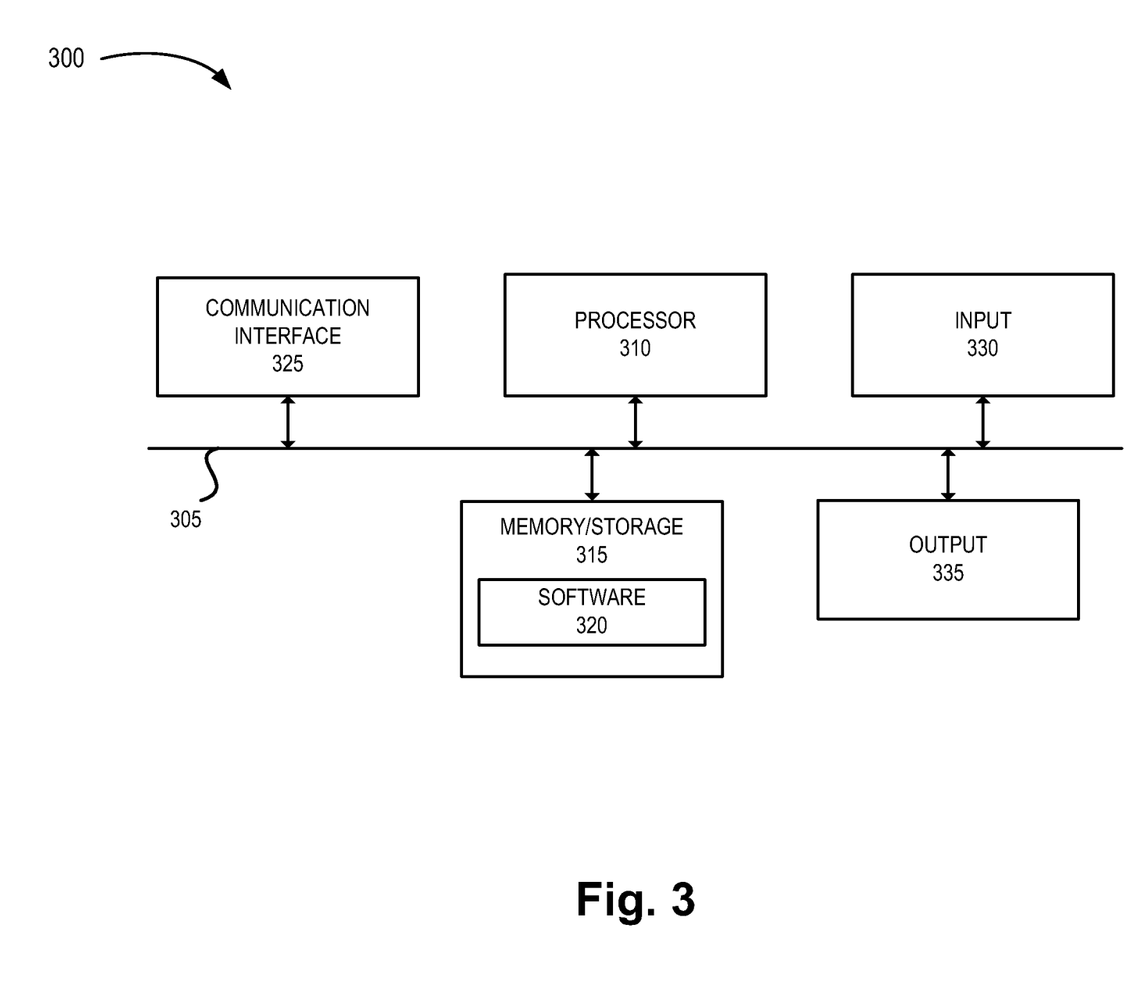
FIG. 3 is a diagram illustrating exemplary components of a device that may correspond to one or more of the devices illustrated and described herein.

FIG. 3 is a diagram illustrating exemplary components of a device 300 that may be included in one or more of the devices described herein. For example, device 300 may correspond to access device 107, external device 117, core device 122, end device 130, distributed controller 252, centralized controller 250, and/or other types of devices, as described herein. As illustrated in FIG. 3, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, clocks, and so forth.

Processor 310 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation, or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, learning, model-based, etc.

Memory/storage 315 includes one or multiple memories and/or one or multiple other types of storage mediums. For example, memory/storage 315 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 315 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 315 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 315 may store data, software, and/or instructions related to the operation of device 300.

Software 320 includes an application or a program that provides a function and/or a process. As an example, with reference to distributed controller 252 and/or centralized controller 250, software 320 may include an application that, when executed by processor 310, provides a function and/or a process of intelligent end-to-end architecture for tiers of application services, as described herein. Additionally, with reference to CU 211 and/or CU 219, software 320 may include an application that, when executed by processor 310, provides a function and/or a process of intelligent end-to-end architecture for tiers of application services, as described herein. Software 320 may also include firmware, middleware, microcode, hardware description language (HDL), and/or other form of instruction. Software 320 may also be virtualized. Software 320 may further include an operating system (OS) (e.g., Windows, Linux, Android, proprietary, etc.).

Communication interface 325 permits device 300 to communicate with other devices, networks, systems, and/or the like. Communication interface 325 includes one or multiple wireless interfaces, optical interfaces, and/or wired interfaces. For example, communication interface 325 may include one or multiple transmitters and receivers, or transceivers. Communication interface 325 may operate according to a protocol stack and a communication standard.

Input 330 permits an input into device 300. For example, input 330 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 335 permits an output from device 300. For example, output 335 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 300 may be implemented in the same manner. For example, device 300 may be instantiated, created, deleted, or some other operational state during its life-cycle (e.g., refreshed, paused, suspended, rebooting, or another type of state or status), using well-known virtualization technologies. For example, access device 107, core device 122, external device 117, and/or another type of network device or end device 130, as described herein, may be a virtualized device.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a function or a process described herein. Alternatively, for example, according to other implementations, device 300 performs a function or a process described herein based on the execution of hardware (processor 310, etc.).

Figure 4:
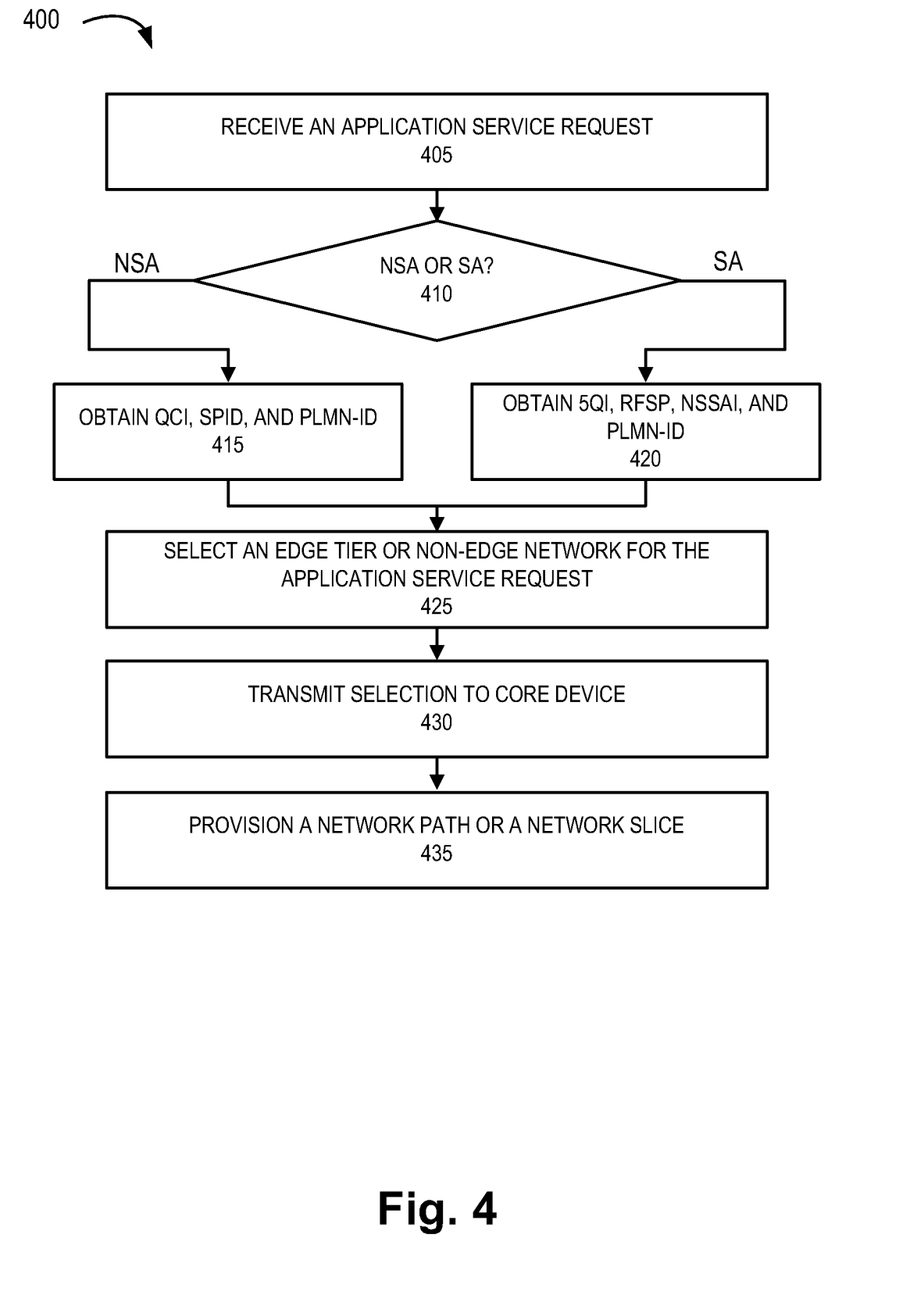
FIG. 4 is a flow diagram illustrating yet another exemplary process of an exemplary embodiment of the intelligent end-to-end architecture for tiers of application services.

FIG. 4 is a flow diagram illustrating an exemplary process 400 of an exemplary embodiment of the intelligent end-to-end architecture for tiers of application services. According to an exemplary embodiment, a mobile edge controller, such as centralized controller 250 and/or distributed controller 252 may perform a step of process 400. According to an exemplary implementation, processor 310 executes software 320 to perform the step of process 400, as described herein. For the sake of simplicity, process 400 will be described in relation to centralized controller 250.

In block 405, centralized controller 250 may receive an application service request. For example, end device 130 may transmit an application service request to establish an application service session.

In block 410, centralized controller 250 may determine whether end device 130 is associated with an NSA connectivity or with an SA connectivity. For example, centralized controller 250 may obtain context information of end device 130 from core device 122 (e.g., an AMF, an MME) or access device 107.

When it is determined that end device 130 is NSA connected (block 410-NSA), centralized controller 250 may obtain additional criteria for network path/network slice determination and selection among the multi-tiered architecture, as described herein, and application service layer network (block 415). For example, centralized controller 250 may obtain QCI, SPID, PLMN-ID, and other context information relating to end device 130 and/or the requested application service.

When it is determined that end device 130 is SA connected (block 410-SA), centralized controller 250 may obtain additional criteria for network path/network slice determination and selection among the multi-tiered architecture, as described herein, and application service layer network (block 420). For example, centralized controller 250 may obtain 5QI, RFSP index, NSSAI, PLMN-ID, and other context information relating to end device 130 and/or the requested application service.

In block 425, centralized controller 250 may select a mobile edge tier from among a multi-tier edge architecture, as described herein and, an edge application service layer network from a multi-tiered edge application service layer network (e.g., far edge, mid edge, edge MEC networks) or a non-MEC network based on the obtained criteria information.

In block 430, centralized controller 250 may transmit the selection of the mobile edge tier and application service layer network to a core device 122, such as an AMF or an MME.

In block 435, centralized controller 250 may coordinate provisioning of a network path and/or a network slice that is supported by access device 107 and core device 122 of the selected mobile edge tier and enables end device 130 to access and use the requested application service associated with the selected application service layer network. For example, centralized controller 250 may provide service orchestration relating to access device(s) 107, core device(s) 122, and/or other network resources.

FIG. 4 illustrates an exemplary embodiment of a process of the intelligent end-to-end architecture for tiers of application services, according to other exemplary embodiments, the intelligent end-to-end architecture for tiers of application services may perform additional operations, fewer operations, and/or different operations than those illustrated and described.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks have been described regarding the processes illustrated in FIG. 4, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 310, etc.), or a combination of hardware and software (e.g., software 320).

Embodiments have been described without reference to the specific software code because the software code can be designed to implement the embodiments based on the description herein and commercially available software design environments and/or languages. For example, diverse types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 310) of a device. A non-transitory storage medium includes one or more of the storage mediums described in relation to memory/storage 315. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A system comprising:
   a radio access network (RAN) that provides radio access to a core network and mobile edge application service layer networks located at different mobile edges including a far edge, a mid edge, and an edge, wherein the RAN includes a first centralized RAN control plane device at the far edge that provides a RAN control plane service for first traffic relating to the far edge and the mid edge but not the edge;
   the core network, wherein the core network includes a first centralized core network control plane device at the far edge that provides a core network control plane service for the first traffic relating to the far edge and the mid edge but not the edge; and
   a distributed edge controller configured to determine routing for application service requests sent from end devices, including selecting between the mobile edge application service layer networks of the far edge or the mid edge based on threshold values pertaining to two or more of a Fifth Generation (5G) Quality of Service Indicator (5QI), a connectivity type including standalone (SA) and non-standalone (NSA), or a Radio Access Technology Frequency Selection Priority (RFSP) Index.

2. The system of claim 1, wherein the first centralized RAN control plane device includes a centralized unit control plane (CU-CP) device, and wherein the first centralized core network control plane device includes a session management function (SMF) and an access and mobility management function (AMF).

3. The system of claim 1, wherein the RAN includes a first RAN user plane device at each of the far edge, the mid edge, and the edge, and the core network includes a first core network user plane device at each of the far edge, the mid edge, and the edge.

4. The system of claim 3, wherein the first RAN user plane device includes a centralized unit user plane (CU-CP) device, and wherein the first core network user plane device includes a user plane function (UPF).

5. The system of claim 1, wherein the RAN includes a second centralized RAN control plane device at the edge that provides the RAN control plane service for second traffic relating to the edge and a non-mobile edge application service layer network connected to the RAN and the core network.

6. The system of claim 1, wherein the core network includes a second centralized core network control plane device at the edge that provides the core network control plane service for second traffic relating to the edge and a non-mobile edge application service layer network connected to the RAN and the core network.

7. The system of claim 1, wherein the threshold values further pertain to at least one of a subscriber profile identifier or a public land mobile network identifier.

8. The system of claim 1, further comprising:
a centralized edge controller configured to determine routing for application service requests between the mobile edge application service layer networks of the far edge, the mid edge, the edge, and a non-mobile edge application service layer network.

9. A network comprising:
a radio access network (RAN) that provides radio access to a core network and mobile edge application service layer networks located at different mobile edges including a far edge, a mid edge, and an edge, wherein the RAN includes a first centralized RAN control plane device at the far edge that provides a RAN control plane service for first traffic relating to the far edge and the mid edge but not the edge;
the core network, wherein the core network includes a first centralized core network control plane device at the far edge that provides a core network control plane service for the first traffic relating to the far edge and the mid edge but not the edge; and
a distributed edge controller configured to determine routing for application service requests sent from end devices, including selecting between the mobile edge application service layer networks of the far edge or the mid edge based on threshold values pertaining to two or more of a Fifth Generation (5G) Quality of Service Indicator (5QI), a connectivity type including standalone (SA) and non-standalone (NSA), or a Radio Access Technology Frequency Selection Priority (RFSP) Index.

10. The network of claim 9, wherein the first centralized RAN control plane device includes a centralized unit control plane (CU-CP) device, and wherein the first centralized core network control plane device includes a session management function (SMF) and an access and mobility management function (AMF).

11. The network of claim 9, wherein the RAN includes a first RAN user plane device at each of the far edge, the mid edge, and the edge, and the core network includes a first core network user plane device at each of the far edge, the mid edge, and the edge.

12. The network of claim 11, wherein the first RAN user plane device includes a centralized unit user plane (CU-CP) device, and wherein the first core network user plane device includes a user plane function (UPF).

13. The network of claim 9, wherein the RAN includes a second centralized RAN control plane device at the edge that provides the RAN control plane service for second traffic relating to the edge and a non-mobile edge application service layer network connected to the RAN and the core network.

14. The network of claim 9, wherein the core network includes a second centralized core network control plane device at the edge that provides the core network control plane service for second traffic relating to the edge and a non-mobile edge application service layer network connected to the RAN and the core network.

15. The network of claim 9, wherein the threshold values further pertain to at least one of a subscriber profile identifier or a public land mobile network identifier.

16. The network of claim 9, further comprising:
a centralized edge controller configured to determine routing for application service requests between the mobile edge application service layer networks of the far edge, the mid edge, the edge, and a non-mobile edge application service layer network.

17. An end-to-end network comprising:
a radio access network (RAN) that provides radio access to a core network and mobile edge application service layer networks located at different mobile edges including a far edge, a mid edge, and an edge, wherein the RAN includes a first centralized RAN control plane device at the far edge that provides a RAN control plane service for first traffic relating to the far edge and the mid edge but not the edge;
the core network, wherein the core network includes a first centralized core network control plane device at the far edge that provides a core network control plane service for the first traffic relating to the far edge and the mid edge but not the edge; and
a distributed edge controller configured to determine routing for application service requests are sent from end devices, including selecting between the mobile edge application service layer networks of the far edge or the mid edge based on threshold values pertaining to two or more of a Fifth Generation (5G) Quality of Service Indicator (5QI), a connectivity type including standalone (SA) and non-standalone (NSA), or a Radio Access Technology Frequency Selection Priority (RFSP) Index.

18. The end-to-end network of claim 17, wherein the first centralized RAN control plane device includes a centralized unit control plane (CU-CP) device, and wherein the first centralized core network control plane device includes a session management function (SMF) and an access and mobility management function (AMF).

19. The end-to-end network of claim 17, wherein the RAN includes a first RAN user plane device at each of the far edge, the mid edge, and the edge, and the core network includes a first core network user plane device at each of the far edge, the mid edge, and the edge.

20. The end-to-end network of claim 17, further comprising:
the mobile edge application service layer networks.

* * * * *